US006843487B1

(12) United States Patent
Lotman

(10) Patent No.: US 6,843,487 B1
(45) Date of Patent: Jan. 18, 2005

(54) MOBILE LIFT ASSEMBLY FOR A VEHICLE

(76) Inventor: David Barry Lotman, 13175 Sand Grouse Ct., Palm Beach Gardens, FL (US) 33410

( * ) Notice: Subject to any disclaimer, the term of this patent is extended or adjusted under 35 U.S.C. 154(b) by 3 days.

(21) Appl. No.: 10/266,281

(22) Filed: Oct. 7, 2002

(51) Int. Cl.[7] .................................................. B62K 15/00

(52) U.S. Cl. ........................ 280/43; 280/47.15; 414/427

(58) Field of Search ......................... 280/43, 431, 43.2, 280/43.13, 43.14, 43.19, 43.24, 47.15, 47.16, 47.2, 79.4, 479.1, 35, 763.1, 764.1, 765.1, 766.1; 414/427, 426, 428; 254/2 R, 8

(56) References Cited

U.S. PATENT DOCUMENTS 1,188,033 A 6/1916 Bihler
1,307,600 A * 6/1919 Heinz .......................... 254/8 B
1,400,931 A * 12/1921 Sydney .......................... 254/1
1,482,954 A * 2/1924 Tideman ...................... 280/43
1,650,031 A 11/1927 Nash
1,681,665 A 8/1928 Haynes
4,030,701 A 6/1977 Pingon
4,295,635 A 10/1981 Pustka et al.
4,350,470 A 9/1982 Murillo
4,465,421 A 8/1984 Murillo
4,542,882 A 9/1985 Choe
4,629,388 A 12/1986 Riemer et al.
4,645,181 A 2/1987 Schapansky
4,948,107 A 8/1990 Orndorff, Jr.
4,993,688 A 2/1991 Mueller et al.
5,039,123 A 8/1991 Smeitink
5,232,206 A 8/1993 Hunt et al.
5,451,080 A * 9/1995 Kneile ...................... 280/763.1
5,765,810 A 6/1998 Mattera
5,893,571 A 4/1999 Nowell

* cited by examiner

*Primary Examiner*—Hau Van Phan
(74) *Attorney, Agent, or Firm*—Malloy & Malloy, P.A.

(57) ABSTRACT

A lift assembly operable by pressurized fluid and structured to movably support a vehicle, such as during the occurrence of a flat tire and including a mounting assembly connected to the vehicle adjacent a predetermined portion thereof associated with the disabled tire. A gripping assembly is disposable into gripping engagement with the vehicle adjacent the predetermined vehicle portion. A support assembly includes at least one support member structured to travel along the supporting surface on which the vehicle is located and further includes a lift mechanism, operable by pressurized fluid, to raise the predetermined portion of the vehicle and the disabled tire above the supporting surface.

31 Claims, 3 Drawing Sheets

Fig 2
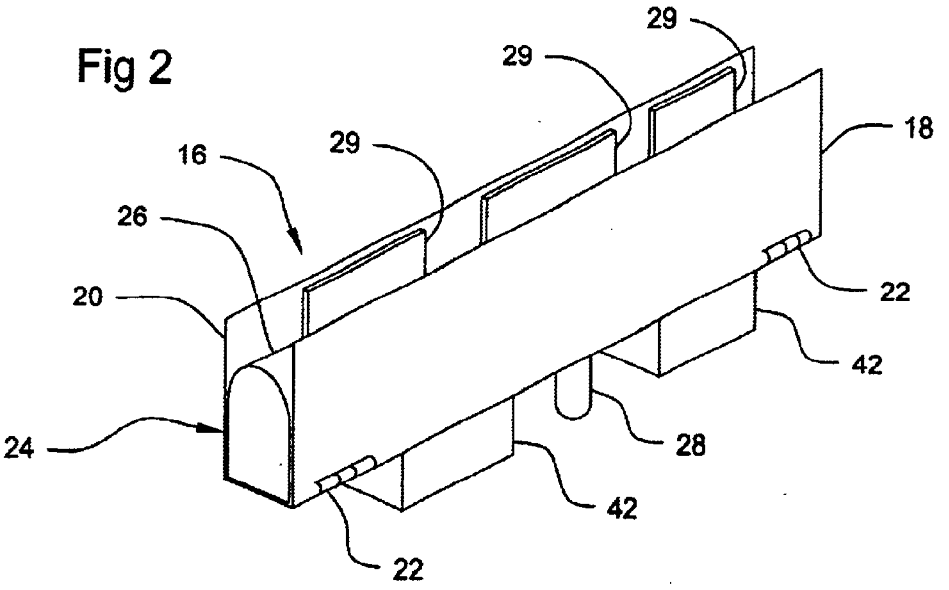
Fig 4
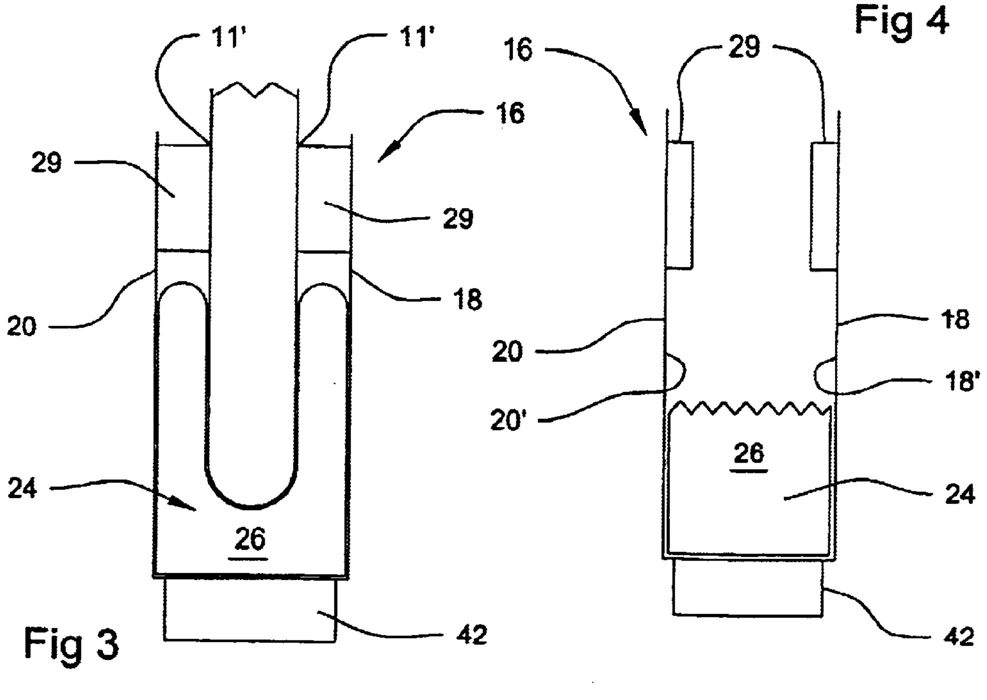
Fig 3

Fig 5
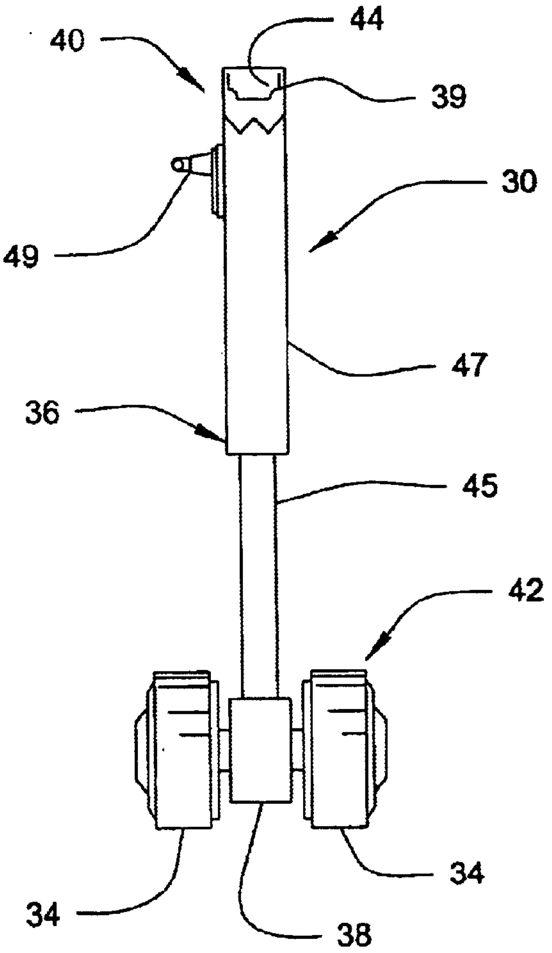
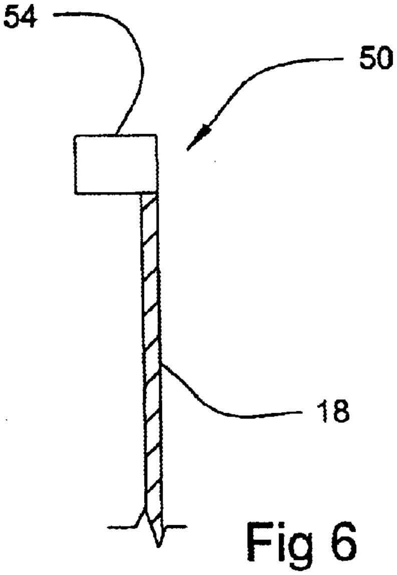
Fig 6
Fig 7
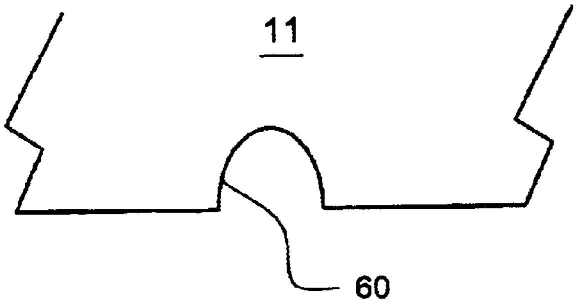

MOBILE LIFT ASSEMBLY FOR A VEHICLE

BACKGROUND OF THE INVENTION

1. Field of the Invention

A lift assembly for a vehicle with a flat tire which is operable by pressurized fluid to raise the portion of the vehicle associated with the disabled tire. The lift assembly includes a support assembly structured to travel along a roadway or other surface concurrently to the vehicle being maintained in the raised position.

2. Description of the Related Art

In the operation and maintenance of automobiles and like motor vehicles, the supply and use of a jack assembly is common place. In typical fashion, a jack assembly is normally supplied as original equipment when the automobile or like vehicle is purchased. Operatively, a conventional jack assembly includes a body having a lift arm or like member structured to engage a predetermined portion of the vehicle, generally located adjacent each of the plurality of wheel wells in which the tires are mounted. Upon the occurrence of a flat tire or other emergency situation which renders the tire or wheel inoperable, the jack is removed from the storage area of the vehicle and placed in supporting engagement with the aforementioned predetermined portion of the vehicle, adjacent the disabled tire. A lug wrench or other structure is typically connected to the base or body of the jack and serves as a lever mechanism. Manual force is applied to the lug wrench causing the effected portion of the vehicle to be raised to a height where the damaged tire no longer engages the road or other supporting surface on which the vehicle is disposed.

Mechanical jack assemblies of the type described above have been improved to operate with greater efficiency. However, the use thereof still requires excessive force which may be beyond the physical capabilities of many individuals. Therefore, a large variety of jack and/or lift assemblies have been devised in order to facilitate the lifting or raising of a vehicle in an emergency situation, without the need for manual exertion. Such structural variations of known jack assemblies include hydraulically powered mechanisms as well as the less commonly available lifting devices which are built into the vehicle itself and operable from the passenger compartment.

Other attempts to facilitate the repair of a disabled vehicle, based upon the occurrence of a flat tire, include the provision of emergency wheels and/or wheel dollys. More specifically, attempts have been made to mount, either permanently or temporarily, relatively small emergency wheel assemblies to the vehicle adjacent the tire or wheel which has become disabled. Problems and/or disadvantages associated with these types of devices involve difficulty in their being securely attached, which is necessary in order for the vehicle to be safely moved. Also the operation and positioning of such emergency wheel devices could be well beyond the ability of many, if not most, vehicle operators.

In the category of wheel dollys, a support platform having a plurality of smaller wheels attached thereto is disposed beneath the disabled tire or wheel. The tire is then "captured" by being securely fastened to the support platform of the dolly. Thereafter, the vehicle is allowed to travel over the roadway, albeit at a much reduced speed, to a facility where proper repairs can be performed. Disadvantages associated with such mobile, support dollys, similarly include an effective means of attaching the wheel to the dolly in a supported orientation so as to allow the vehicle to safely travel over a conventional roadway.

While known structures to improve the procedures for replacing a disabled tire, such as of the type set forth above, are assumed to be at least minimally operable for their intended purpose, their size, structural and operational complexity, cost, and a variety of other factors, have rendered such devices less than popular with the average vehicle operator. Therefore, it is well recognized that the vast majority of jack structures or other lift assemblies, whether mechanically or hydraulically operated, may be of little practical use during an emergency situation involving a flat tire. Compounding the problems associated with use and operation of conventional jack structures is the variety of different automobiles and like motor vehicles currently in use. Such a diversity in automobile designs frequently requires that a "customized" jack structure be used with each model or make of automobile.

Therefore, there is a long recognized need in this area for a lift assembly which is universally adaptable for use on a variety of different automobiles or other mobile vehicles. If any such lift assembly were developed, it would preferably not require the application of manual force by an operator or passenger of the vehicle during its use. Further, the operative positioning of any such lift assembly would ideally be simple, quick and easily accomplished in a failsafe manner in order to avoid the possibility of dangerous misplacement of the lift assembly during its operation. In addition, if any such lift assembly were developed, it should also be strong, durable and have a long operable life, yet be of sufficient dimension and configuration to facilitate the storage thereof within minimal space or area of the vehicle. Finally, the structural and operative features of any such improved lift assembly should enable it to movably support at least a portion of the disabled vehicle in a manner which allows the vehicle to travel over existing roadways, or other surfaces, to a location where permanent repairs can be performed.

SUMMARY OF THE INVENTION

The present invention addresses these and other needs which remain in the art and is directed to a lift assembly structured to movably support automobiles or other motorized vehicle during emergency situations, such as when the vehicle is disabled by a flat tire. More specifically, the lift assembly of the present invention is intended to be easily secured to any one of a plurality of predetermined locations, preferably adjacent a wheel well of the vehicle, when the vehicle has a flat tire. As such, the lift assembly of the present invention eliminates the inconvenience and problems associated with replacing the disabled tire/wheel with a "spare tire" of the type intended to be carried by most, if not all motor vehicles. Further, the lift assembly of the present invention is relatively compact, of generally light weight construction and may be easily stored within a convenient storage area of the vehicle. As set forth in greater detail hereinafter, the lift assembly is operative to allow the vehicle to travel along conventional roadways or surfaces to a service station or other repair facility where the disabled tire/wheel can be repaired or replaced.

More specifically, the lift assembly of the present invention comprises a mounting assembly connected to the vehicle adjacent any one of the aforementioned predetermined portions located adjacent to the wheel well of the disabled tire. In the various preferred embodiments of the present invention, the mounting assembly can be removably secured in the appropriate position on the vehicle or alternatively, can be permanently secured to the vehicle. The mounting assembly preferably comprises a plurality of at least two mounting members movably connected to one another and disposed, when in an operative position, in spaced apart relation and in an orientation which facilitates the attachment to and gripping of the vehicle in a secure manner.

A gripping assembly is mounted on and/or connected to the mounting assembly and includes at least one gripping member preferably mounted between the two mounting members. The gripping member is structured, when pneumatically activated, to be disposed into gripping engagement with the vehicle. In at least one preferred embodiment, the gripping member comprises an elongated, inflatable bladder extending between the mounting members and along at least the majority of the length thereof. Alternate embodiments contemplated by the present invention include a plurality of gripping members, each comprising an inflatable bladder. The bladders are located in adjacent or contiguous relation to one another and are inflatable so as to collectively and securely grip the predetermined portion of the vehicle which is being supported.

In order to facilitate storage of the lift assembly of the present invention, the gripping assembly may remain in a collapsed or non-inflated condition until ready for use. When raising and support of the vehicle is required, such as during an emergency situation as set forth above, a supply of pressurized air or other fluid is connected to an appropriately located valve assembly. The inflation of the gripping assembly serves to orient the mounting members for positioning into secure engagement with the vehicle. Also, the gripping assembly is inflated to the point where the predetermined portion of the vehicle is gripped and thereby secured to the mounting assembly.

The lift assembly of the present invention further comprises at least one, but preferably, two support assemblies each removably connected to the mounting assembly and collectively structured to movably support the predetermined portion of the vehicle to which the mounting assembly is secured. While the specific structural configuration of at least one preferred embodiment of the present invention may include the use of a single support assembly, a most preferred embodiment comprises at least two support assemblies, which may or may not be further braced by being interconnected. However, each of the support assemblies are connected to the mounting assembly in spaced relation to one another.

Further, each support assembly includes a lift mechanism and a support member. The support member of each support assembly is structured to engage and travel along the ground, roadway or other supporting surface on which the vehicle is disposed and thereby, allow the vehicle to safely travel to an appropriate repair facility or other location. The lift mechanism of each support assembly is operable by the introduction of pressurized fluid, such as air or other fluids, to raise the predetermined portion of the vehicle being supported, to a height where the disabled tire/wheel is spaced above the supporting surface of the vehicle. When in such an operative position, the aforementioned support member of each of the one or more support assemblies movably engages the ground or road surface concurrently to the lift mechanism of each support assembly being longitudinally extended into the aforementioned operative position. When the vehicle reaches its destinations where repair or replacement of the disabled tire is performed, the lift mechanism associated with each of the one or more support assemblies may be lowered by releasing the air or gas initially forced into the lift mechanism. As such, at least one preferred embodiment of the present invention comprises each lift mechanism including a piston and cylinder assembly positioned between the ground engaging support member and the mounting assembly.

Further structural features of the lift assembly of the present invention include an attachment assembly preferably secured to appropriate portions, such as interior surface portions, of each of the interconnected mounting members. In at least one preferred embodiment of the present invention, the attachment assembly may comprise at least one but preferably a plurality of magnets. The magnets are disposed in spaced relation to one another and oriented so as to be removably secured to correspondingly disposed surfaces of the predetermined portions of the vehicle. The positioning of the attachment assembly, in the manner set forth herein, further enhances a secured engagement of the mounting assembly with the vehicle. Therefore detachment of the mounting assembly from the vehicle during travel over conventional roadways, while being suspended or supported in the aforementioned raised, operative position, will be avoided.

Therefore, the lift assembly of the present invention is structured to overcome the long recognized disadvantages and problems associated with the replacement of a flat tire with a spare tire and the operation of a conventionally structured jack assembly in attempting to so. Moreover, the lift assembly of the present invention may be secured to a variety of different models or makes of motor vehicles with little or no structural modification. Also, the structural and operational features of the inventive lift assembly allow it to be easily and quickly installed by the operator or passenger of a vehicle regardless of their age or physical condition.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 2 is a perspective view of a mounting assembly of a preferred embodiment of the lift assembly of the present invention.

FIG. 3 is an end view of the embodiment of FIG. 2 in at least a partially operative position, gripping a predetermined portion of the vehicle being supported.

FIG. 4 is an end view of an embodiment of FIG. 3 shown in a collapsed or stored position out of engagement with the vehicle.

FIG. 5 is a front, detailed view of one of a possible plurality of support assemblies of the preferred embodiment of the lift assembly, as shown in FIG. 1.

FIG. 6 is a sectional view in partial cutaway taken along line 6—6 of FIG. 1.

FIG. 7 is a side view in partial cutaway of a portion of an undercarriage of a vehicle being supported by the embodiment of FIGS. 1 and 6.

Like reference numerals refer to like parts throughout the several views of the drawings.

DETAILED DESCRIPTION OF THE PREFERRED EMBODIMENT

Figure 1:
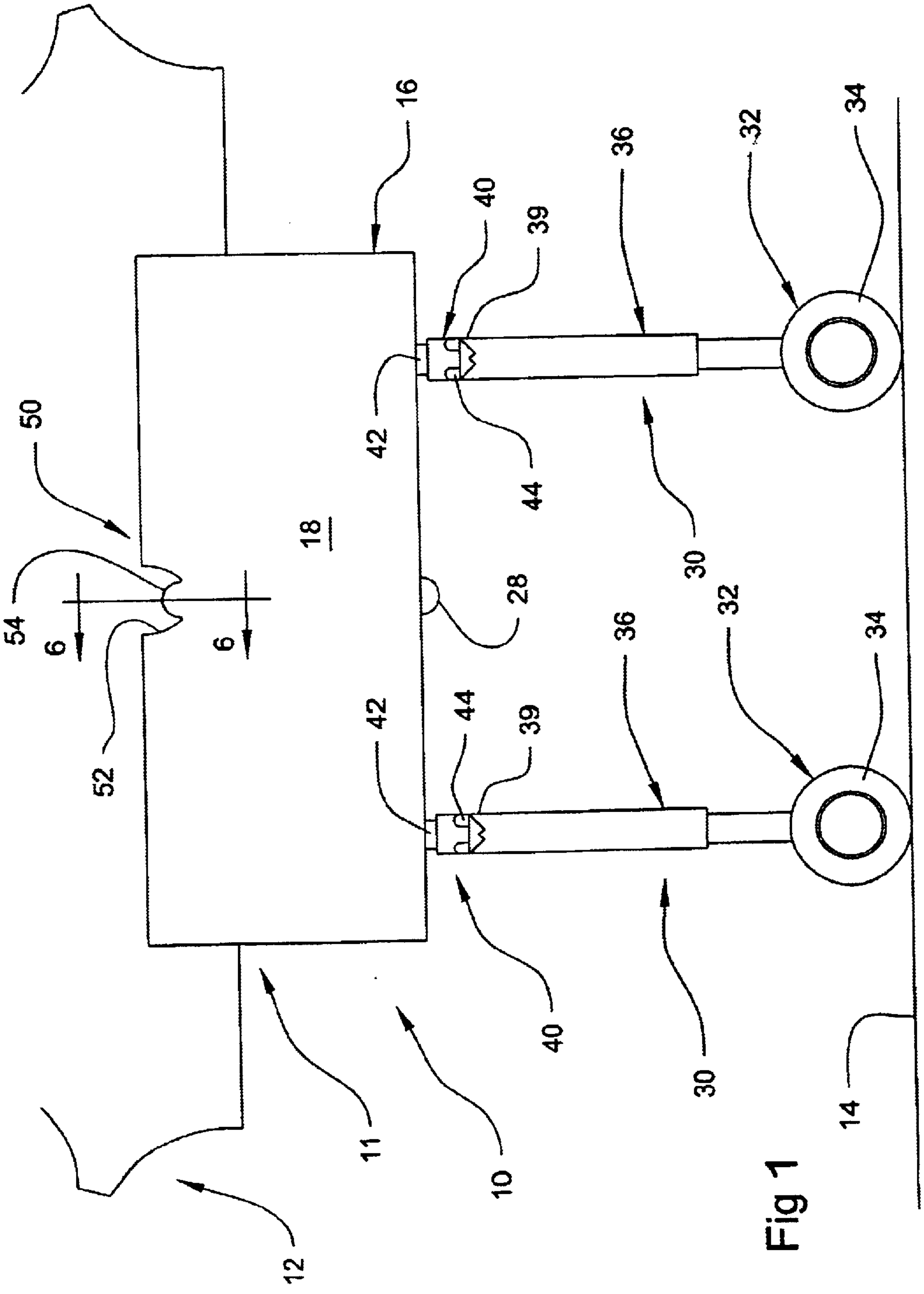
FIG. 1 is a side view in partial cutaway of a lift assembly of the present secured to one of a plurality of possible predetermined portions of a vehicle which is intended to be supported due to the occurrence of a disabled tire or wheel.

As shown in the accompanying drawings, the present invention is directed to a lift assembly, generally indicated as 10, which is structured to support any of a plurality of different predetermined portions 11 of a vehicle, such as when the vehicle has encountered a flat tire or like emergency. Accordingly, each of the predetermined portions 11 of the vehicle is generally disposed adjacent a different wheel well, generally indicated as 12. Therefore, operation of the lift assembly 10 serves to raise the disabled tire or wheel above the ground, road or other supporting surface 14 on which the vehicle is disposed. The preferred embodiment of the lift assembly 10, as schematically depicted in FIG. 1, is disposed in supporting engagement with one of the plurality of predetermined portions 11. As will be apparent hereinafter, the actual structure and location of the predetermined portion 11 of the vehicle engaged and supported by the lift assembly 10 may of course vary dependent on the make, model, size, configuration, etc. of the vehicle. It is emphasized that the predetermined portions 11 intended to be engaged by a jack or other lifting device are typically located on an undercarriage and/or frame of the vehicle rather than on a fender or other exterior portion of the vehicle.

More specifically, one preferred embodiment of the lift assembly 10 of the present invention comprises a mounting assembly generally indicated as 16. The mounting assembly 16 preferably includes two mounting members 18 and 20. The two mounting members 18 and 20 are movably interconnected and selectively positioned between an operable position as best shown in FIG. 3 and a collapsed or stored position as best shown in FIG. 4. Interconnection between the mounting members 18 and 20 may be accomplished by any applicable securement facility, such as hinge structures 22. The hinge structure 22 may be spring biased so as to normally orient the mounting members 18 and 20 in the collapsed position of FIG. 4.

As is demonstrated throughout the Figures, the plurality of mounting members 18 and 20 are collectively structured to assume somewhat of a U-shape configuration. This configuration, among others, are contemplated to facilitate securement of the mounting assembly 16 to one of the plurality of predetermined portions 11 of a variety of different makes, models, sizes, configurations, etc. of a motor vehicle. As set forth above, the predetermined portions 11 define appropriate locations on the vehicle where the lift assembly 10 (or conventional jack structure) may be secured to efficiently raise and support the disabled tire or wheel, such as adjacent a wheel well 12. It is emphasized that the mounting members 18 and 20 can have a variety of different structures and/or configurations other than that shown in FIGS. 2 through 4 in order to better accomplish a secure, gripping engagement with one of the predetermined portions 11 of the vehicle being supported.

In order to accomplish a secure, reliable, gripping engagement between the mounting assembly 16 and the predetermined portion 11 of the vehicle, a most preferred embodiment of the lift assembly 10 of the present invention comprises a gripping assembly generally indicated as 24. The gripping assembly 24 is structured to be pneumatically activated and/or positioned into gripping engagement with one of the plurality of predetermined portions 11. As such, the gripping assembly 24 includes at least one gripping member comprising an inflatable bladder 26 connected to or mounted on the mounting assembly 16 and extending between and along at least the majority of the length of the mounting members 18 and 20. While the preferred embodiments of FIG. 2 through 4 show the gripping assembly 24 comprising a single gripping member in the form of the inflatable bladder 26, it is contemplated within the intended spirit and scope of the present invention to include a plurality of such inflatable bladders collectively extending between and along at least the majority of the length of the mounting members 18 and 20.

In either of the aforementioned embodiments, the at least one gripping member 26 or inflatable bladder is selectively oriented between the collapsed, stored position of FIG. 4 and the expanded, inflated and operative position of FIG. 3. When in the stored position, the gripping member 26 is maintained between the mounting members 18 and 20 which in turn are disposed in somewhat closer spaced relation to one another. However, when activated, air or other gas under pressure is enforced into the interior of the inflatable gripping member 26 such as through a flow regulating valve 28. This serves to pneumatically activate and/or inflate the gripping assembly 24 causing it to at least partially surround, in gripping engagement, correspondingly disposed exterior surfaces 11' of the predetermined portion 11 of the vehicle being supported. By virtue of this surrounding, gripping engagement, the mounting assembly 16 is secured to the predetermined portion 11 in a reliable manner. Further, the one or more inflatable gripping members 26 comprises a configuration and dimension sufficient to not only securely engage the predetermined portion 11, in the manner shown in FIG. 3, but to also at least partially cushion the predetermined portion 11 of the vehicle. This cushioning capability will serve to accommodate a significant amount of the weight of the vehicle that will be concentrated on the mounting assembly 16 and a support assembly, generally indicated as 30, described in detail with specific reference to FIGS. 1 and 5.

Additional structural features of the mounting assembly 16 includes the provision of an attachment assembly. The attachment assembly includes at least one but preferably a plurality of attachment members 29 mounted on the interior surfaces of at least one but preferably both of the mounting members 18 and 20, as at 18' and 20' respectively. In order to enhance the versatility of the lift assembly 10 in allowing it to be attached to a variety of different makes, models, etc. of vehicles, at least some of the plurality of attachment members 29 are defined by magnets. The magnetic attachment members 29 are magnetically secured to corresponding exterior surface portions 11' of the predetermined portion 11 of the vehicle being supported. This magnetic attraction will further facilitate a reliable and safe securement of the mounting assembly 16 to the predetermined portion 11 of the vehicle.

With primary reference to FIGS. 1 and 5, the lift assembly 10 of the present invention further comprises at least one but preferably a plurality of support assemblies 30. Each support assembly 30 can be substantially equivalently structured and therefore the features described in the single support assembly 30 disclosed in FIG. 5 are applicable to each of the support assemblies 30. As such, each support assembly 30 comprises a support member, generally indicated as 32, disposed and structured to travel along a supporting surface 14 on which the vehicle is located. The support members 32 may comprise one or more wheels, tires, rollers, balls, etc. as at 34. In the preferred embodiment of FIG. 5, the support member 32 includes a pair of spaced apart but interconnected wheel structures 34 connected at one end of a lift mechanism generally indicated as 36. Both wheels 34 are connected by stub axles to a journal box 38. The journal box 38 and the connecting axles are cooperatively structured to allow pivotal or rotational movement of the support member 32 about the longitudinal axis of the lift mechanism 36 in order to accommodate various changes in movement of the vehicle as it travels along the supporting surface 14.

The opposite end of each of the support assemblies 30, relative to the support member 32 is removably connected to the mounting assembly 16 such as by a connector assembly generally indicated as 40. The connector assembly 40 may take a variety of different structural and operative configurations. At least one preferred embodiment includes the connector assembly 40 comprising a male connector 42 secured to the exterior of the mounting assembly 16 and being dimensioned- and configured to fit within a female pocket or chamber 44 formed in an upper most end 39 of the lift mechanism 36.

As set forth above, at least one preferred embodiment of the lift assembly 10 contemplates both the mounting assembly 16 and the one or more support assemblies 30 being removably secured to the predetermined portion 11 of the vehicle. However, another preferred embodiment of the lift assembly 10 contemplates at least the mounting assembly 16 being fixedly or permanently secured to the vehicle. In this latter embodiment each of a plurality of mounting assemblies 16 would be fixedly or permanently secured to the vehicle at a different one of a plurality of predetermined portions 11 disposed substantially adjacent each of the wheel wells 12. Accordingly, in a most preferred embodiment of the present invention, it is contemplated that the support assemblies 30 would be removably secured to the mounting assembly 16 and connected thereto when needed to movably support one or more of the predetermined portions 11 of the vehicle, such as when the vehicle is temporarily disabled due to a flat tire or the like. However, another preferred embodiment of the present invention comprises the one or more support assemblies 30 being movably and/or adjustably mounted on the vehicle and selectively disposed into and/or out of the position of FIG. 1.

With primary reference to FIG. 5, each of the one or more support assembly 30 comprises the aforementioned lift mechanism 36 which may be preferably defined by a piston and cylinder assembly. More specifically, the piston and cylinder assembly may include a piston segment 45 mounted within and movable relative to a cylinder segment 47. In the embodiment of FIG. 1, the lift assembly 10 is represented in a substantially retracted position, wherein the majority of the length of the piston 45 remains within the cylinder 47. However, upon the introduction of air or other fluid under pressure into cylinder segment 47, by means of a valve structure 49, the piston 45 will be forced outwardly from the interior of the cylinder 47 and into a longitudinally extended and operative position shown in FIG. 5. Accordingly the operative position is at least partially defined by the one or more support assemblies 30 being longitudinally extended or expanded to a length sufficient to raise the disabled tire or wheel off of the supporting surface 14.

While not specifically disclosed, the source of pressurized fluid used to inflate the one or more gripping members 26 as well as expand the lift mechanism 36 of the one or more support assemblies 30 may come from a common source. As such, the source or supply of pressurized fluid may be a canister or container maintained under sufficient pressure and having sufficient quantity of fluid contained therein to inflate both the gripping member 26 and raise the lift mechanisms 36 of each of the support assemblies 30. Naturally, a variety of other sources of pressurized fluid may be utilized to operate and activate the pneumatically operative components of the lift assembly 10.

Additional structural features of the lift assembly 10 of the present invention include the provision of an indicator structure generally indicated as 50 and including a cutout portion 52 and a "reverse notch" or inwardly directed protrusion 54 formed within the recess 52. The indicator structure 50 is provided so as to properly orient or aligned the mounting assembly 16 when secured to the one or more predetermined portions 11 on the vehicle being supported. Further, the reverse notch or portion 54 is connected to and protrudes inwardly from at least one of the mounting members 18 as shown in FIG. 6 in order to be removably positioned within a recess or cutout portion 60 typically formed in the undercarriage of many vehicles. It is common practice in many modern day vehicles to provide a specific receiving groove or area 60 for the placement of conventional jack structures. Such receiving grooves 60 assure that any lifting force, applied to the vehicle, will be exerted at the proper location on the vehicle. Therefore, when such a receiving groove 60 has been previously and permanently formed in the frame to indicate the predetermined portion 11, the indicator 50 is thereby cooperatively structured to include the reverse notch or protrusion 54 so as to locate and/or be received therein. Further, while not shown in FIG. 2, the indicator structure including, the recess 52 and the reverse notch 54 may be mounted on both of the mounting members 18 and 20 in an appropriate location.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A lift assembly structured to movably support a vehicle, said lift assembly comprising:

a) a mounting assembly connected to the vehicle adjacent a predetermined portion thereof, b) a gripping assembly including at least one gripping member structured to be disposed into gripping engagement with the vehicle, c) a support assembly connected to said mounting assembly and including at least one support member disposed in engaging relation to a supporting surface on which the vehicle is located, d) said support member structured to travel along the support surface concurrently to disposition of said support assembly in an operative position relative to the vehicle, and e) said gripping member comprising an inflatable structure disposed in gripping engagement with the vehicle adjacent the predetermined portion thereof.

2. A lift assembly as recited in claim 1 wherein said inflatable structure comprises an elongated bladder expandable along its length into gripping engagement with the vehicle.

3. A lift assembly as recited in claim 1 wherein said mounting assembly comprises a plurality of mounting members disposed in at least partially spaced apart relation.

4. A lift assembly as recited in claim 3 wherein said plurality of mounting members are disposed in secured engagement with said vehicle upon disposition of said gripping member in gripping engagement with the vehicle.

5. A lift assembly as recited in claim 4 wherein said mounting assembly includes an attachment assembly secured to said plurality of mounting members in interconnecting relation to the vehicle.

6. A lift assembly as recited in claim 1 wherein said mounting assembly is removably connected to the vehicle.

7. A lift assembly as recited in claim 6 wherein said mounting assembly is removably connected to the vehicle adjacent anyone of a plurality of different predetermined portions thereof.

8. A lift assembly structured to movably support a vehicle, said lift assembly comprising:

a) a mounting assembly connected to the vehicle adjacent a predetermined portion thereof, b) a support assembly connected to said mounting assembly and including at least one support member disposed in engaging relation to a supporting surface on which the vehicle is located, c) said support assembly comprising a lift mechanism disposed between said mounting assembly and said support member and structured to pneumatically orient said support assembly in an operative position, and d) said support member structured to travel along the supporting surface concurrently to disposition of said support assembly in said operative position relative to the vehicle.

9. A lift assembly as recited in claim 8 wherein said operative position is at least partially defined by said lift mechanism extending upwardly from said support member a sufficient distance to raise a tire of the vehicle above the supporting surface.

10. A lift assembly as recited in claim 9 wherein said lift mechanism comprises a piston and cylinder structure pneumatically operable to dispose the support assembly in said operative position.

11. A lift assembly as recited in claim 8 wherein said support assembly is removably connected to said mounting assembly.

12. A lift assembly as recited in claim 11 wherein said mounting assembly is removably connected to the vehicle.

13. A lift assembly as recited in claim 8 wherein said mounting assembly comprises a plurality of mounting members disposed in at least partially spaced apart relation; said mounting assembly further including an attachment assembly secured to said plurality of mounting members in interconnecting relation to the vehicle.

14. A lift assembly as recited in claim 13 wherein said attachment assembly comprises a magnetic attachment structure mounted on at least one of said plurality of mounting members and disposed to removably secure said mounting assembly to the vehicle.

15. A lift assembly structured to movably support a vehicle, said lift assembly comprising:

a) a mounting assembly connected to the vehicle adjacent a predetermined portion thereof and including a gripping assembly, b) said gripping assembly including at least one inflatable gripping member expandable into gripping engagement with the vehicle adjacent the predetermined portion, c) a support assembly connected to said mounting assembly and including at least one support member disposed in engaging relation to a supporting surface on which the vehicle is located, d) said support assembly further including a lift mechanism disposed between said mounting assembly and said support member and structured to pneumatically orient said support assembly in an operative position, and e) said support member structured to travel along the supporting surface concurrently to disposition of said support assembly in an operative position relative to the vehicle.

16. A lift assembly as recited in claim 15 wherein said inflatable gripping member comprises a bladder structure expandable into gripping engagement with the vehicle.

17. A lift assembly as recited in claim 16 wherein said lift mechanism comprises a piston and cylinder structure pneumatically operable to dispose said support assembly in said operative position.

18. A lift assembly as recited in claim 15 wherein said mounting assembly comprises a plurality of mounting members disposed in at least partially spaced apart relation and further including an attachment assembly secured to at least one of said plurality of mounting members in interconnecting relation to the vehicle.

19. A lift assembly as recited in claim 18 wherein said attachment assembly comprises a magnetic attachment structure mounted on at least one of said plurality of mounting members and disposed to removably secure said mounting assembly to the vehicle.

20. A lift assembly as recited in claim 15 wherein said support assembly is removably connected to said mounting assembly.

21. A lift assembly as recited in claim 20 wherein said mounting assembly is removably connected to the vehicle.

22. A lift assembly as recited in claim 21 wherein said mounting assembly is removably connected to the vehicle adjacent anyone of a plurality of different predetermined portions thereof.

23. A lift assembly as recited in claim 15 wherein said operative position is at least partially defined by said lift mechanism extending upwardly from said support member a sufficient distance to raise a tire of the vehicle above the supporting surface.

24. A lift assembly structured to movably support a vehicle, said lift assembly comprising:

a) a mounting assembly connected to the vehicle adjacent a predetermined portion thereof, b) a gripping assembly including at least one gripping member structured to be pneumatically disposed into gripping engagement with the vehicle, c) a support assembly connected to said mounting assembly and including at least one support member disposed in engaging relation to a supporting surface on which the vehicle is located, d) said support member structured to travel along the support surface concurrently to disposition of said support assembly in an operative position relative to the vehicle, and e) said support assembly comprising a lift mechanism disposed between said mounting assembly and said support member and structured to pneumatically orient said support assembly in said operative position.

25. A lift assembly as recited in claim 24 wherein said operative position is at least partially defined by at least a portion of said lift mechanism extending upwardly from said support member a sufficient distance to raise a tire of the vehicle above the supporting surface.

26. A lift assembly as recited in claim 25 wherein said lift mechanism comprises a piston and cylinder structure pneumatically operable to dispose the support assembly in said operative position.

27. A lift assembly as recited in claim 24 wherein said support assembly is removably connected to said mounting assembly.

28. A lift assembly as recited in claim 27 wherein said mounting assembly is removably connected to the vehicle.

29. A lift assembly structured to movably support a vehicle, said lift assembly comprising:

a) a mounting assembly including a plurality of mounting members connected to the vehicle adjacent a predetermined port ion thereof, b) a gripping assembly including at least one gripping member structured to be pneumatically disposed into gripping engagement with the vehicle, c) a support assembly connected to the mounting device and including at least one support member disposed in engaging relation to a supporting surface on which the vehicle is located, d) said support member structured to travel along the support surface concurrently to disposition of said support assembly in an operative position relative to the vehicle, and e) said mounting assembly further including an attachment assembly, aid attachment assembly comprising at least one magnetic attachment member disposed and structured to removably secure at least one of said plurality of mounting members to the vehicle.

30. A lift assembly as recited in claim 29 wherein said gripping member comprises an inflatable bladder expandable between said mounting members into gripping engagement with the vehicle.

31. A lift assembly as recited in claim 30 wherein said mounting members are disposed in secured engagement with said vehicle concurrently to inflation of said bladder into gripping engagement with the vehicle.

* * * * *